L. H. ESSELMANN.
BATTER FEEDER FOR PASTRY FORM MACHINES.
APPLICATION FILED NOV. 5, 1918.

1,303,218.

Patented May 6, 1919.

Inventor:
Louis H. Esselmann,
By Hugh K. Wagner,
Attorney.

UNITED STATES PATENT OFFICE.

LOUIS H. ESSELMANN, OF ST. LOUIS, MISSOURI.

BATTER-FEEDER FOR PASTRY-FORM MACHINES.

1,303,218. Specification of Letters Patent. Patented May 6, 1919.

Application filed November 5, 1918. Serial No. 261,285.

*To all whom it may concern:*

Be it known that I, LOUIS H. ESSELMANN, a citizen of the United States, residing at the city of St. Louis, in the State of Missouri, have invented certain new and useful Improvements in Batter-Feeders for Pastry-Form Machines, of which the following is a specification.

This invention consists of an apparatus for automatically permitting and preventing the flow of batter to molds for forming pastry cones. So far as the inventor is aware, this is the first automatic apparatus for that purpose.

Figure 1:
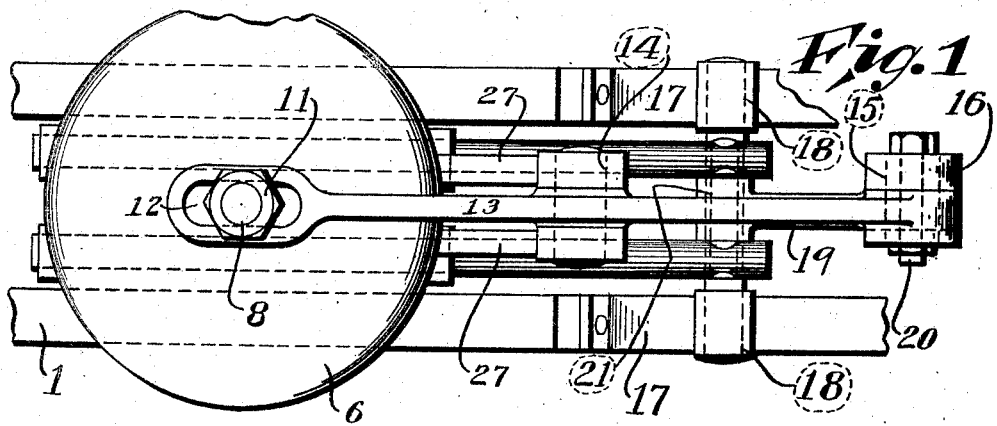
Figure 2:
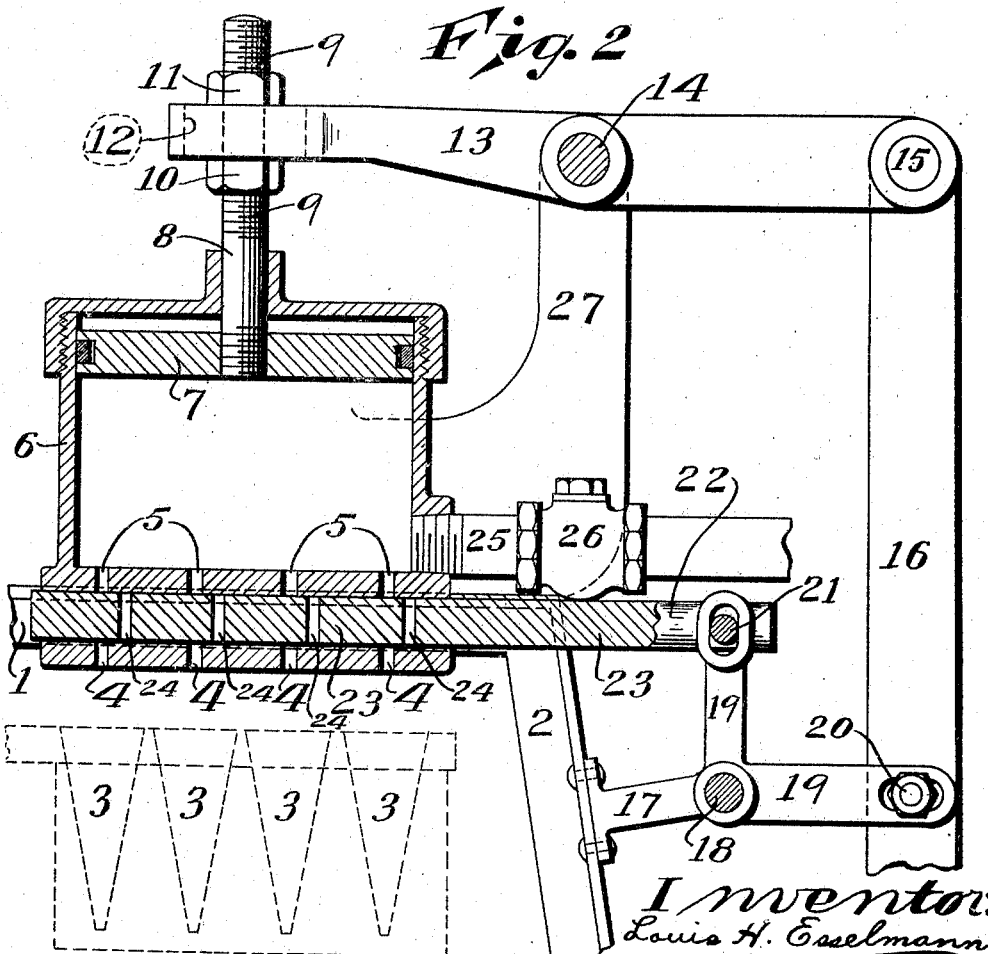

In the accompanying drawings forming part of this specification, in which like numbers of reference denote like parts wherever they occur, Figure 1 is a top plan view; and Fig. 2 is a side elevation, partly in section.

The frame 1 is supported by standards 2 resting upon the floor or ground or other suitable place. The bank of molds 3 may also be supported therefrom or in any other suitable manner.

Each mold 3 is located opposite a port 4, registering with a port 5, leading from a batter pump 6.

Within the pump 6 is located piston 7, mounted on piston rod 8, provided with screw-threaded portion 9, which allows for the adjustment of the nuts 10 and 11.

Slot 12 is formed in one end of lever 13 and rod 9 passes through slot 12 so as to receive nut 11. The slotted end of lever 13 is tightly held between nuts 10 and 11. The lever 13 can be adjusted up or down on rod 9 by reason of the adjustability of nuts 10 and 11, which determines the thrust of piston 7 and therefore the degree of pressure upon the batter within pump 6, which may be increased or diminished, according to the consistency of the batter, the condition of the apparatus, etc. This adjustability allows also compensation for the wear of parts.

Lever 13 is fulcrumed at 14 and pivoted at 15 to a rod 16 adapted for vertical reciprocating movement.

A bracket 17 extends outwardly from one of the standards 2 and bears the fulcrum 18 for bell-crank lever 19, the outer end of one arm of which is in loose pivotal connection at 20 to rod 16, and the outer end of the other arm of which is in loose pivotal connection at 21 to the outer end 22 of valve 23. Ports 24 extend through valve 23, and are so located as to register with ports 4 and 5 when a flow of batter is desired and not to register therewith when it is desired to shut off the flow of batter from the pump 6 to molds 3.

Fig. 2 clearly shows valve 23 in closed position, so that batter will not flow from pump 6 through ports 5, 24, and 4 into molds 3. Power being communicated in any suitable manner to cause rod 16 to rise will at the same time rock lever 13 in such manner as to depress piston 7, rock bell-crank 19, and thereby move valve 23 to the left in Fig. 2, which causes ports 24 to register with ports 4 below and 5 above.

Pipe 25, controlled by valve 26, conducts the batter from any suitable source of supply to pump 6.

Bracket 27 supports fulcrum 14.

Having thus described this invention, I hereby reserve the benefit of all changes in form, arrangement, order, or use of parts, as it is evident that many minor changes may be made therein without departing from the spirit of this invention or the scope of the following claim.

I claim:

An apparatus of the character described comprising a pump casing having a series of normally spaced pairs of outlets in its bottom, a slide operative between the outlets of such pairs and formed with a series of openings which may be brought into alinement with the outlets of such pairs to form an unbroken communication therebetween, a piston in the casing, a lever supported for pivotal movement and adjustably connected at one end of the piston, a bell crank mounted below the lever and terminally connected to the slide, and a rod adapted for reciprocative movement and connected at one end to the lever and at an intermediate point to the remaining terminal of the bell crank.

In testimony whereof I hereunto affix my signature.

LOUIS H. ESSELMANN.

Copies of this patent may be obtained for five cents each, by addressing the "Commissioner of Patents, Washington, D. C."